United States Patent
Lewis et al.

(10) Patent No.: US 10,122,669 B1
(45) Date of Patent: Nov. 6, 2018

(54) SOCIAL ANNOTATIONS DERIVED FROM CLIENT CONTACT LISTS

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 917 days.

(21) Appl. No.: 14/283,160

(22) Filed: May 20, 2014

(51) Int. Cl.
*G06F 15/16* (2006.01)
*H04L 12/58* (2006.01)
*G06Q 50/00* (2012.01)
*H04W 4/21* (2018.01)

(52) U.S. Cl.
CPC ............. *H04L 51/32* (2013.01); *G06Q 50/01* (2013.01); *H04W 4/21* (2018.02)

(58) Field of Classification Search
CPC ....... H04L 12/588; H04L 51/32; H04L 51/34; G06Q 30/02; G06Q 10/10; G06F 17/30864; G06F 17/30997; G06F 17/30038
USPC .................................. 707/E17.095, 102, 961
See application file for complete search history.

(56) References Cited

U.S. PATENT DOCUMENTS

| | | | | |
|---|---|---|---|---|
| 9,060,034 B2 * | 6/2015 | Black | ................... | G06Q 10/107 |
| 9,460,457 B1 * | 10/2016 | Shaffer | ............. | G06Q 30/0276 |
| 2008/0195657 A1 * | 8/2008 | Naaman | ............. | G06K 9/00677 |
| 2010/0325218 A1 * | 12/2010 | Castro | .................... | G06Q 10/10 |
| | | | | 709/206 |
| 2014/0185609 A1 * | 7/2014 | Efrati | ............. | H04M 1/274516 |
| | | | | 370/352 |
| 2014/0201178 A1 * | 7/2014 | Baecke | ............. | G06F 17/30038 |
| | | | | 707/706 |
| 2014/0325557 A1 * | 10/2014 | Evans | ................ | H04N 21/4788 |
| | | | | 725/34 |
| 2015/0039584 A1 * | 2/2015 | Bastide | ............. | G06F 17/30864 |
| | | | | 707/709 |
| 2015/0121547 A1 * | 4/2015 | Hafeez | .................... | G06F 21/10 |
| | | | | 726/28 |
| 2015/0139610 A1 * | 5/2015 | Syed | ...................... | G11B 27/34 |
| | | | | 386/241 |
| 2015/0154167 A1 * | 6/2015 | Arhin | ................ | G06F 17/30386 |
| | | | | 715/233 |
| 2015/0286716 A1 * | 10/2015 | Snibbe | ............. | G06F 17/30026 |
| | | | | 707/610 |
| 2016/0094708 A1 * | 3/2016 | Brown | ................ | H04W 68/005 |
| | | | | 455/414.1 |
| 2016/0239918 A1 * | 8/2016 | Lambur | ................ | G06Q 40/06 |

* cited by examiner

Primary Examiner — Aftab N. Khan
(74) Attorney, Agent, or Firm — Lowenstein Sandler LLP

(57) ABSTRACT

A method for deriving social annotations from a client contact list is disclosed. The method includes transmitting, by a client device, a request for a media item. The method further includes receiving, by the client device, the requested media item and social annotation data related to the requested media item. The received social annotation data is at least partially derived from a plurality of contact identifiers obtained from a contact list associated with the client device. The requested media item and at least one social annotation based on the social annotation data are presented by the client device.

28 Claims, 8 Drawing Sheets

SOCIAL ANNOTATIONS DERIVED FROM CLIENT CONTACT LISTS

TECHNICAL FIELD

This disclosure relates to the field of social annotations, in particular, to deriving social annotations from client contact lists.

BACKGROUND

On the Internet, social networks allow users to connect with each other and share information. Many social networks include a content sharing aspect that allows users to upload, view, and share content, such as video content, image content, audio content, and so on (which may be collectively referred to as "media items", "media content", or "content items"). Such media items may include audio clips, movie clips, TV clips, and music videos, as well as amateur content such as video blogging, short original videos, pictures, photos, other multimedia content, etc. Media items may also refer to other types of content, including representations of products (e.g., product listings from online merchants), articles (e.g., reviews, news articles, product descriptions, etc.), or any other type of contextual data that may be presented using a display and/or audio device. Users may use computing devices (such as smart phones, cellular phones, laptop computers, desktop computers, netbooks, tablet computers) to use, play, and/or consume media items (e.g., watch digital videos, listen to digital music, read articles, etc.).

Social networking services enable a primary user to be associated with other users, and such associations are described in a social graph, which are typically maintained by a social media service, but can also be maintained locally on a personal device of the primary user (e.g., a contact list). Some of these associated users may also be interested in similar content, and these associated users may assert an influence over each other's content selections. Such associations have been utilized in the form of social annotations, which are annotations that can accompany media items, features, or products with pictures of user faces (or some other identifier) from a social graph the viewing user belongs to. For example, an item may display an indication to a user that a friend of the user has endorsed that item by displaying a thumbnail depiction of the friend next to the item. Social annotations have been particularly useful when applied to video recommendations, subscription services, friend or follower recommendations, and advertisements.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for presenting social annotations to a user of a client device is disclosed. The method includes transmitting, by the client device, a request for a media item. The method further includes receiving, by the client device, the requested media item and social annotation data related to the requested media item, in which the social annotation data is at least partially derived from a plurality of contact identifiers obtained from a contact list associated with the client device. The requested media item and at least one social annotation based on the social annotation data are then presented by the client device.

In another implementation, a method for requesting a media item is disclosed. The method includes receiving, by a processing device, an indication of a request for a media item, in which the request was generated at a client device of a first user, the client device storing contact identifiers of a plurality of contacts of the first user. The method further includes identifying, based on a contact list associated with the client device, users who are associated with the first user and who performed an action related to the requested media item, in which the contact list includes user accounts of a subset of the plurality of contacts of the first user. Social annotation data is generated based on the users followed by the first user and the actions performed by the users followed by the first user. The generated social annotation data is transmitted to the client device.

In one or more of the disclosed implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings, in which.

DETAILED DESCRIPTION

Implementations are described for deriving social annotations from contact identifiers stored in a client contact list. Social annotations are generally derived from a single explicit social graph from a social network. Mobile devices also have their own built-in social graphs in the form of local contact lists. However, phone contact lists have not been used for social annotations since they are stored on client devices, which are inaccessible to the servers that typically provide social annotations. The implementations described herein allow for contact identifiers, such as phone numbers stored on a client device, to be matched with a third party social media or network account (e.g., if account discoverability settings of the corresponding user permits such a matching), thus allowing for the generation and delivery of socially annotated recommendations to an owner of a contact list on the client device. This enhances the likelihood that the recommendations will be better received and more relevant to the receiving user than non-socially annotated recommendations.

Phone numbers may serve as contact identifiers in the sense that, in most cases, two people/businesses will not have the exact same phone number. Thus, matching the phone number with a social account (if any exist that are associated with the number) and treating the phone number in the same way or with a certain weight, depending on call frequency and length, as when the user is logged into the social account may prove to be a reliable way of building and maintaining social graphs.

Some of the disclosed implementations are useful for retrieving pictures associated with a user account for use as social annotations when bandwidth limitations affect mobile devices. Phone numbers are often associated with pictures stored locally on the client device, thus allowing the social annotation service to forego retrieving server-side available pictures from the server and instead utilize the pictures stored on the client device.

The methods of generating social annotations disclosed herein may associate contact identifiers from a user's contact list with one or more respective social accounts. A contact identifier might be a phone number, e-mail address, username, or a combination or hash of these elements. The method uses the contact identifiers to identify associated user accounts. For example, a phone number might be used in a reverse lookup to identify an e-mail account.

Figure 1A:
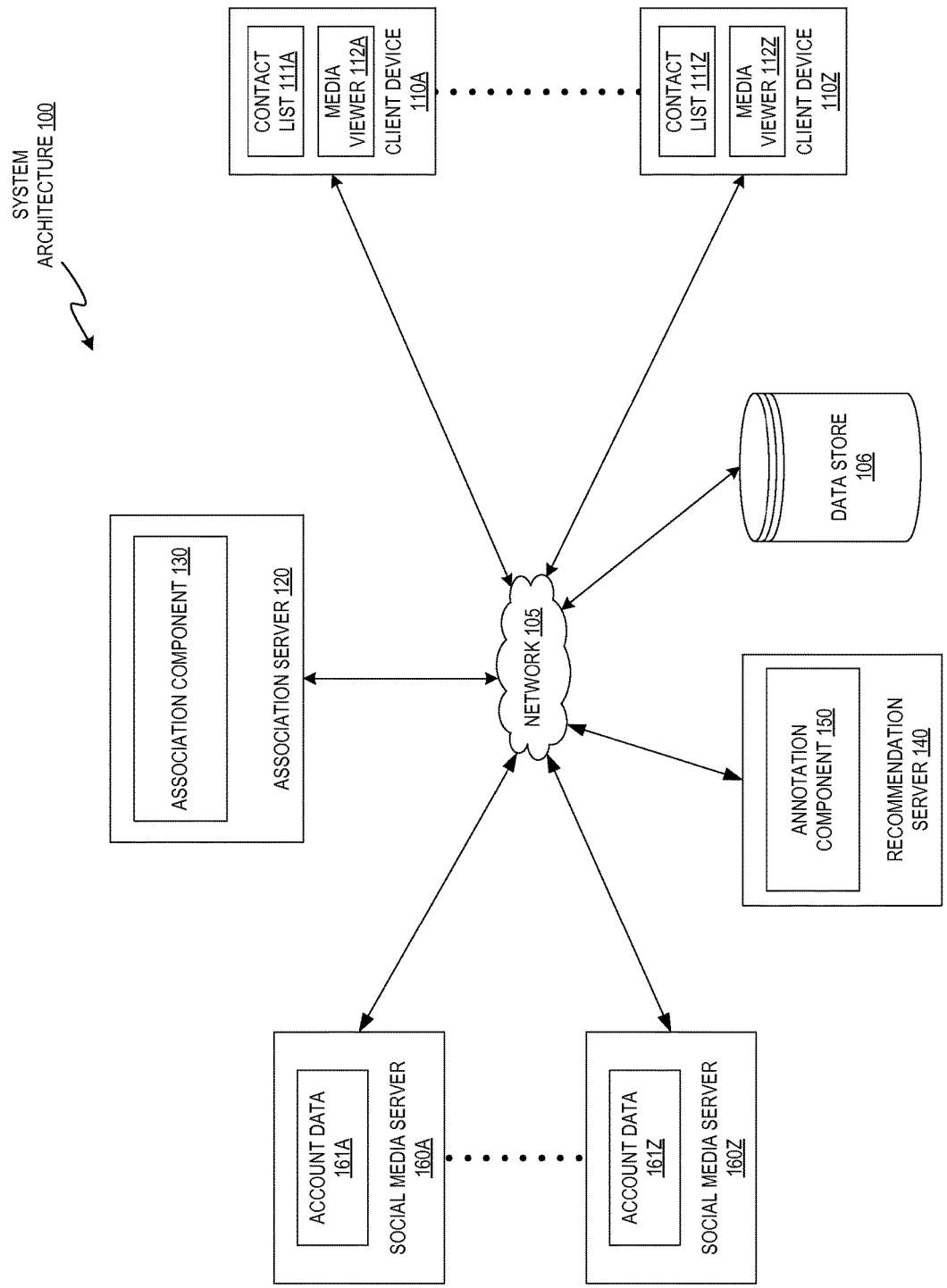
FIG. 1A illustrates an example system architecture in accordance with an implementation of the disclosure.

FIG. 1A illustrates an example system architecture 100, in accordance with an implementation of the disclosure, for deriving social annotations from client contact lists. The system architecture 100 includes client devices 110A through 110Z, a network 105, a data store 106, an association server 120, a recommendation server 140, and social media servers 160A through 160Z. Each of social media servers 160A through 160Z store and maintain account data 161A through 161Z, respectively, with each of account data 161A through 161Z containing account data for one or more users (e.g., one or more users of client devices 110A through 110Z).

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user".

In implementations of the disclosure, the terms "user account", "account information", "user account information", "user account data", and "account data" each refer to any stored account information that corresponds to a particular user (or a group of users in some implementations), and may contain information generated by or on behalf of the particular user. The user account may also include user settings (e.g., device settings), account preferences (e.g., for a social media account), discoverability settings, contact lists (e.g., an e-mail address book, a list of telephone numbers, etc.), social graph information (e.g., a list of associates of a similar social media service personalization data, a "buddy list", etc.), user media content information (e.g., preferred content, media content playlists, endorsement information, etc.).

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and data store 106 may configured to provide secure storage for private data.

The client devices 110A through 110Z may each include computing devices such as personal computers (PCs), laptops, mobile phones, smart phones, tablet computers, netbook computers etc. Client devices 110A through 110Z may also be referred to as "user devices" or "mobile devices". An individual user may be associated with (e.g., own and/or use) one or more client devices (e.g., one or more of client devices 110A through 110Z). Client devices 110A through 110Z may each be owned and utilized by different users at different locations, and these different users are not necessarily associated with each other (e.g., by a social graph). User account information may be stored on a particular user device (e.g., client device 110A), may be shared among multiple user devices, may be stored locally or remotely (e.g., in the data store 106), or may be stored on one or more of the association server 120, the recommendation server 140, or the social media servers 160A through 160Z. In some implementations, an individual user device, such as client device 110A, may include user account information for different users (e.g., a user account for each member for a family that shares a single family computer).

In implementations disclosed herein, each client device 110A through 110Z may include a contact list 111A through 111Z, respectively. Contact lists may serve as a social graph that links the user to other associated users. For example, client device 110A may be a cell phone, and contact list 111A may be a list of phone numbers of associates of the user (also referred to as "other users") through which client device 110A may be used to contact the associates of the user. As another example, client device 110Z may be a home computer, and contact list 111Z may be a locally stored e-mail address book that is utilized by e-mail software on client device 110Z to communicate the user and his/her associates. In some implementations, any of the contact lists 111A through 111Z may be stored remotely (e.g., in the data store 106), may partially be stored remotely, or may be distributed across multiple users devices (e.g., user devices all owned or used by the same user) and/or remote sources (e.g., in the data store 106).

Each client device 110A through 110Z includes a media viewer 112A through 112Z, respectively. In one implementation, the media viewers 112A through 112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content (e.g., a web page, a media viewer) to a user. The media viewer 112A may also display an embedded media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.).

In some implementations, the media viewers 112A through 112Z may enable their respective client device 110A through 110Z to view social annotations. For example, when the media viewer 112A is displaying content (e.g., a video, an image, a webpage, an advertisement, etc.), the media viewer 112A may also display social annotations that indicate endorsements of the displayed content. The social annotations may be visual annotations, such as text (e.g., a name of the person endorsing the content, a review of the content, etc.), an image (e.g., a picture of the person endorsing the content, a "seal of approval" that identifies the person endorsing the content, etc.), or audio/video annotations (a review video from the person endorsing the content, an audio clip from the person endorsing the content, etc.). In some implementations, the media viewers 112A through 112Z receive social annotation data for content from recommendation server 140, and format the social annotation data in an appropriate manner for presenting the social annotation on a respective client device 110A through 110Z. The media viewers 112A through 112Z may format the social annotations based on device capabilities (such as screen size, resolution, available memory, etc.). For example, if a particular user device has a limited screen size (e.g., a cell phone with a small displayable area), its media viewer may scale down visual social annotations in size, may display less than all available social annotations (e.g., selecting those that are determined to be more relevant to the user, as will be described in more detail below), may display a text-based annotation rather than an image-based annotation, or any suitable combination thereof.

The media viewers 112A through 112Z may be provided to the client devices 110A through 110Z by any one of the association server 120, recommendation server 140, or social media servers 160A through 160Z. For example, the media viewers 112A through 112Z may be embedded media players that are embedded in web pages provided by the social media servers 160A through 160Z. In another example, the media viewers 112A through 112Z may be applications (e.g., mobile apps) that are downloaded from the social media servers 160A through 160Z.

In general, functions described in one implementation as being performed by any of the association server 120, recommendation server 140, or social media servers 160A through 160Z can also be performed on the client devices 110A through 110Z in other implementations if appropriate. For example, the client device 110A may implement a software application that performs the functions of the association component 130, as will be described in more detail below. In addition, the functionality attributed to a particular component can be performed by different or multiple components operating together. The recommendation server 140 can also be accessed as a service provided to other systems or devices through appropriate application programming interfaces, and thus is not limited to use in websites.

In one implementation, the social media servers 150A through 150Z may each be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The social media servers 160A through 160Z may allow a user to interact with other users inside or outside of a social graph as well as consume, upload, search for, approve of ("like"), disapprove of ("dislike"), comment on, and recommend media items. The social media servers 160A through 160Z may each provide a website (e.g., a webpage) that may be used to provide a user with options to communicate with other users and access to media items.

In situations in which the systems discussed herein collect personal information about users, or may make use of personal information, the users may be provided with an opportunity to control whether the systems discussed herein collect user information (e.g., information about a user's social network, social actions or activities, profession, a user's contact lists, a user's preferences such as a discoverability setting, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. In another example, when the systems discussed herein utilize contact identifiers to locate users, the owners of the user accounts may control whether their user accounts are discoverable. For example, an account owner may specify one or more discoverability settings that prevents contact identifiers from being used to locate the account by systems or services, such as recommendation server 140 and one or more of social media servers 160A through 160Z. Thus, the user may have control over how information is collected about the user and used by the systems discussed herein.

A client device may access a social media server in various ways. In one implementation, a client device may access a user account maintained by a social media server through a web browser installed on the client device. For example, a user of the client device (e.g., client device 110A) may access, via a website, his/her video community account, which may be maintained across one or more social media servers (e.g., one or more of social media servers 160A through 160Z). In one implementation, the client device may have an application (an "app") installed that is specific to a particular social media service. In any of these implementations, the user may access his/her account data to manage account information and configure settings.

In one implementation, the recommendation server 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The recommendation server 140 may generate various types of recommendations based on account data of individual users, groups of related users, and/or demographic data. Recommendations may be any suitable medium for providing a potential item of interest to a user, including, but not limited to, media content recommendations (e.g., movies, television shows, music, user-generated content), product recommendations, service recommendations (e.g., restaurants, movie theaters, retail stores, etc.), event recommendations (e.g., community events, concerts, sporting events), advertisements, coupons, schedules (e.g., flight itineraries, hotel accommodations, theater listings, etc.), and articles (e.g., news articles, product reviews, etc.).

The recommendation server 140 may receive requests for recommendations from various sources, including the social media servers 160A through 160Z, association server 120, and client devices 110A through 110Z. As an example, a user of client device 110A may access his/her social media account maintained by social media server 160A. In response, social media server 160A may transmit at least a portion of the user's account data to the recommendation server 140, which may identify a suitable advertisement for presenting to the user based on the user's account data (e.g., the user may have indicated that he/she likes action movies in his/her social media account, and recommendation server 140 may identify an advertisement for a currently playing action movie). The identified advertisement may be transmitted to social media server 160A, which packages the advertisement with information to be transmitted to client device 110A. When the user utilizes a social media service of social media server 160A from the client device 110A, the advertisement generated by the recommendation server 140 may be presented to the user (e.g., using the media viewer 112A of the client device 110A).

Recommendations generated by the recommendation server 140 may be in the form of social annotations, which may be generated based on a user's association with other users via social media services. The recommendation server may utilize an annotation component 150 to generate social annotations, which may accompany items (e.g., media content, product information, etc.) presented on a client device. Further description of the annotation component 150 and its specific functions is provided in more detail with respect to FIG. 1A.

In one implementation, the association server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The association server 120 may be a server utilized by any of the client devices 110A through 110Z, the recommendation server 140, and the social media servers 160A through 160Z to facilitate the generation of social annotations. In some implementations, the association server 120 may utilize an association component 130 to generate associations between client devices and account data stored on social media servers. For example, the association component 130 may utilize information stored in a user's contact list (e.g., contact list 111A of client device 110A) to generate associations between account data corresponding to different users (e.g., account data 161Z of social media server 160Z). Further description of the annotation component 150 and its specific functions is provided in more detail with respect to FIG. 1B.

Although implementations of the disclosure are discussed in terms of social media service information used to annotate media content items, implementations may also be generally applied to any system in which associations are to be made between separate sets of data. Thus, implementations of the disclosure are not limited to social annotations of media content items.

Figure 1B:
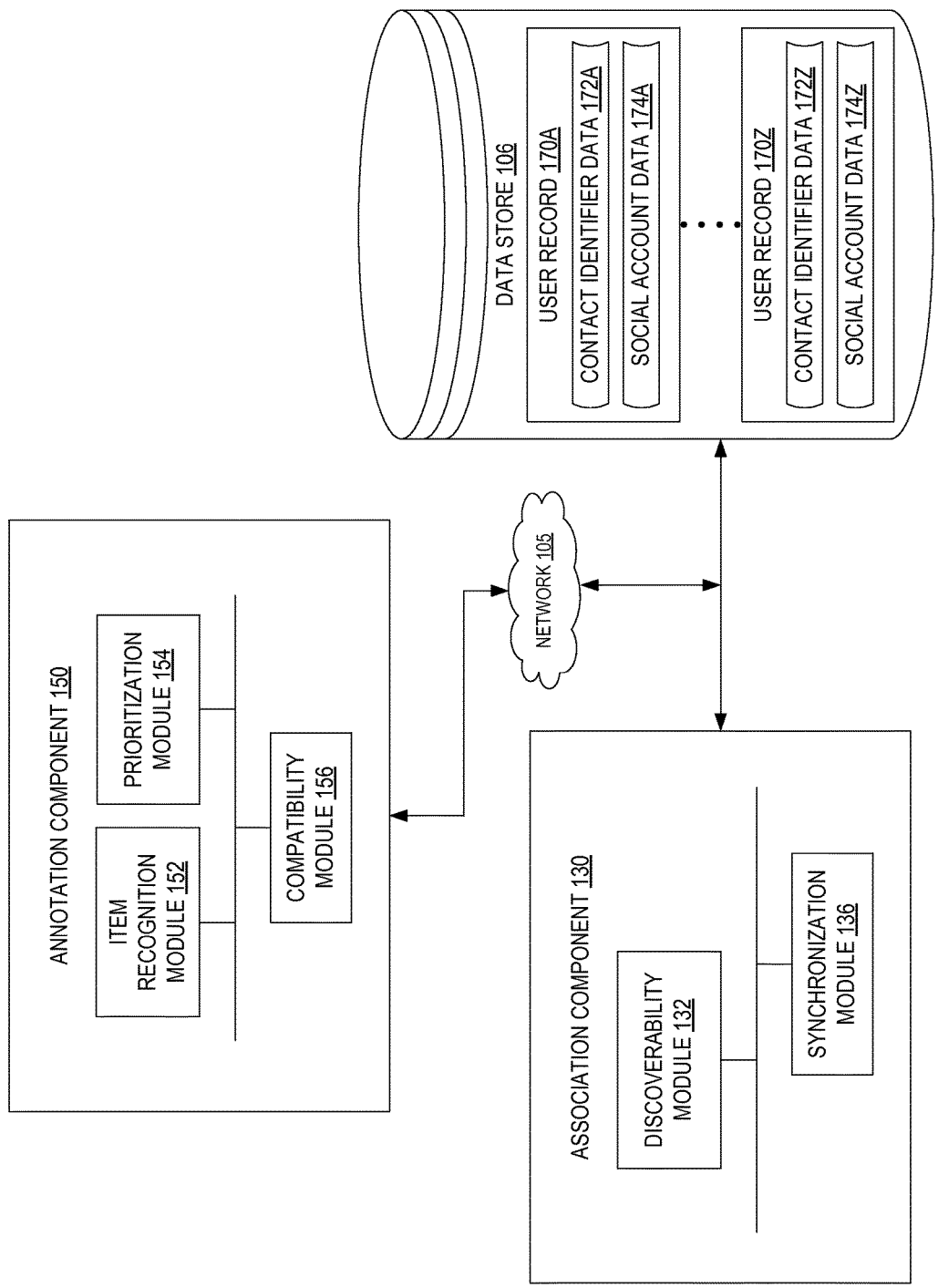
FIG. 1B is a block diagram illustrating annotation and association components in accordance with an implementation of the disclosure.

FIG. 1B is a block diagram illustrating an association component 130 and an annotation component 150 in accordance with one implementation of the disclosure. In one implementation, the association component 130 includes a discoverability module 132 and a synchronization module 134. More or less components may be included in the association component 130 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.). The association component 130 was described as being implemented by the association server 120 described with respect to FIG. 1A, but may be implemented by any of the client devices 110A through 110Z, the recommendation server 140, and the social media servers 160A through 160Z. For example, a client device (e.g., client device 110A) may be programmed to perform all of the functions of the association component 130. When the association component 130 is implemented on a client device, any functions described with respect to the association component 130 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

In one implementation, the association component 130 is communicatively coupled to the data store 106. For example, the association component 130 may be coupled to the data store 106 via a network (e.g., via network 105 as illustrated in FIG. 1A). In another example, the association component 130 may be coupled directly to a server where the association component 130 resides (e.g., may be directly coupled to the association server 120). As described with respect to FIG. 1, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers), and may be cloud-based. Data store 106 may be part of or distributed between any of the client devices 110A through 110Z, the association server 120, the recommendation server 140, and the social media servers 160A through 160Z, as described with respect to FIG. 1A.

In one implementation, the data store 106 includes user records 170A through 170Z, where each record may correspond to a user of a social media service. Each of user records 170A through 170Z include, respectively, contact identifier data 172A through 172Z and social account data 174A through 174Z. The term "association table" may refer to a collective group of user records (e.g., user records 170A through 170Z) or may refer to individual user records (e.g., user record 170A). In one implementation, a primary user may be associated with or have assigned an association table that includes data related to other users that are associated with the primary user (e.g., contacts of the primary user linked by at least one social graph). In some implementations (e.g., when the association component 130 is implemented on a client device), the association table associated with the primary user may be a contact list of the primary user, and may be stored in a memory of a client device of the primary user, on one or more different devices (e.g., data store 106), or a combination of both. In one implementation, the association table may be stored on an association server (e.g., the association server 120).

The association component may receive one or more contact identifiers in accordance with any of the implementations described herein. A contact identifier may be any image, sound, or string of characters associated with an individual that identifies the individual to another (e.g., in a unique way), including, but not limited to, a personal phone number, a personal e-mail address, a social account identifier, a username, and combinations thereof. While the examples described herein relate to phone numbers and e-mail addresses, it is to be understood that any contact identifier could be used in accordance with the disclosed implementations.

Once the one or more contact identifiers are received by the association component, the association component may utilize the discoverability module 132 in order to identify an account associated with the contact identifier. For example, if user A created a social network account that includes a phone number of user A, the discoverability module 132 may identify the social network account of user A. In some implementations, the discoverability module 132 may query one or more social media servers (e.g., social media servers 160A through 160Z) to identify account data (e.g., account data 161A through 161Z) that contains the contact identifier. Each social media server with account data containing the contact identifier may respond to the discoverability module 132 by transmitting account data to the association component 130. In some implementations, the transmitted account data contains an identifier of the social account corresponding to the contact identifier (e.g., a social account number, a universal resource locator (URL), a username, etc.).

In one implementation, the discoverability module 132 further determines whether a discoverability setting associated with each identified user account permits associations between the contact identifier and the identified user account. For example, a discoverability setting for a social network account of user A may permit access to user A's phone number (i.e., contact identifier) by third parties. In such an instance, the discoverability module 132 may determine that an association between user A's contact identifier and user A's social account is permitted and store the association in an association table (e.g., user record 170A of data store 106). On the other hand, user B's social network account may have a discoverability setting set by user B that forbids access to user B's phone number by third parties (although it may be contained in user B's account for security purposes, such as for lost password recovery). In such an instance, the discoverability module 132 may determine that no association may be made between user B's contact identifier and user B's social account.

In one implementation, the association component 130 utilizes a synchronization module 134 to curate the association table. For example, the synchronization module 134 may identify duplicate records corresponding to the same user that were generated from different contact identifiers (e.g., if the user has two personal e-mail addresses). The synchronization module may search through the association table to identify different records containing common social account data, determine that these two records were associated with different contact identifiers, and then consolidate the record such that the two separate contact identifiers are grouped together. The synchronization module 134 may also determine that querying social media servers can be avoided to reduce bandwidth consumption, for example, by determining that the contact identifier is already accounted for in the association table.

In one implementation, the annotation component 150 includes an item recognition module 152, a prioritization module 154, and a compatibility module 156. More or less components may be included in the annotation component 150 without loss of generality. For example, two or more of the modules may be combined into a single module, or one of the modules may be divided into two or more modules. In one implementation, one or more of the modules may reside on different computing devices (e.g., different server computers, on a single client device, or distributed among multiple client devices, etc.). The annotation component 150 was described as being implemented by the recommendation server 140 described with respect to FIG. 1A, but may be implemented by any of the client devices 110A through 110Z, the association server 120, and the social media servers 160A through 160Z. For example, a client device (e.g., client device 110A) may be programmed to perform all of the functions of the annotation component 150. When the annotation component 150 is implemented on a client device, any functions described with respect to the annotation component 150 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

The annotation component 150 is communicatively coupled to the data store 106. For example, the association component 130 may be coupled to the data store 106 via a network (e.g., via network 105 as illustrated in FIG. 1A). In another example, the annotation component 150 may be coupled directly to a server where the annotation component 150 resides (e.g., may be directly coupled to the recommendation server 140).

The annotation component may utilize user records 170A through 170Z to generate social annotations that may serve as recommendations for items presented to a user of a client device. Item recognition module 152 may be used to identify the item, which may be indicated directly by the user of the client device (e.g., the user transmits a request from the client device requesting a media item, such as a video), indicated directly by a third party (e.g., a social media service may request a particular advertisement be presented to the user by the client device), or may be identified based on contacts associated with the user (e.g., by identifying items of interest to contacts followed by the user).

In one implementation, the annotation component 150 may utilize an item recognition module 152 to generate or identify a canonical identifier for the item. In implementations of the disclosure, the term "canonical identifier" refers to a common identifier that links two separate instances of an identical or substantially similar item. In some implementations, the item recognition module 152 may retrieve metadata associated with the item from a location from which the item is sourced. In scenarios in which different "versions" of the item are each endorsed by different users, the item recognition module may compare metadata for each of the item versions and make a high level determination as to whether these items are the same or substantially similar based on the comparison. To illustrate this, suppose the contact list of user A contains contact identifiers for users B and C. User A may have requested to watch a video clip of show X, and this information was transmitted to the annotation component 150 to generate the appropriate annotations for when the video clip is ultimately presented to user A. The item recognition module 152 of the annotation component 150 may utilize metadata associated with the video clip (e.g., the title of show X from a metadata tag) to generate or retrieve a canonical identifier (e.g., which may be the title of the show). The item recognition module 152 may then search through user accounts associated with each of users B and C to identify any actions these users have taken regarding show X. The item recognition module 152 may determine that user A has purchased "Show X: Season 4" from an online merchant and has submitted a positive review. The item recognition module 152 may also determine that user B has "liked" a social network page dedicated to show X. Accordingly, the annotation component 150 may then generate annotation data for the video clip that, when viewed by the user, shows social annotations in the vicinity of the video clip indicating that users A and B endorse show X.

In one implementation, the annotation component 150 may utilize a prioritization module 154 to determine which social annotations may be more important to a user, and to limit the number of annotations provided to the user or displayed to the user. For example, the prioritization module 154 may utilize user account data to determine which social media services are most relevant to the user (e.g., accessed more frequently by the user), and may generate annotation data for a subset of social media services represented by the identified user accounts. In some implementations, the prioritization module 154 may eliminate one or more "duplicate" social annotations (e.g., endorsements of the same item made by the same contact but using different user accounts belonging to the contact) in favor of a single social annotation corresponding to a social media service most relevant to the user. In some implementations, social annotations may be ranked or weighted based on their potential relevance to the user. For example, the prioritization module 154 may utilize user account data related to the user's interactions with his/her contacts, such as number of phone calls, phone call length, number of e-mails sent/received, number of text messages sent/received, etc., to predict which contacts are likely to be associated with social annotations that are more significant to the user. The ranked/weighted social annotation data may, for example, be utilized by the client device to determine an order or subset of annotations to be displayed so as to provide the most relevant social annotations to the user.

In one implementation, the annotation component 150 may utilize a compatibility module 156 to determine which types of social annotations are compatible with the client device or the interface through which the social annotations are to be presented. For example, the compatibility module 156 may analyze user account data to determine which type of device will be presenting the social annotation data, or which interface (e.g., web interface, website, mobile device application, etc.) will be presenting the social annotations. The compatibility module 156 may format the annotation data such that the data, when utilized by the client device, is formatted properly for display. For example, the compatibility module 156 may acquire or generate thumbnail images that are of an appropriate size and/or resolution for the client device.

Figure 1C:
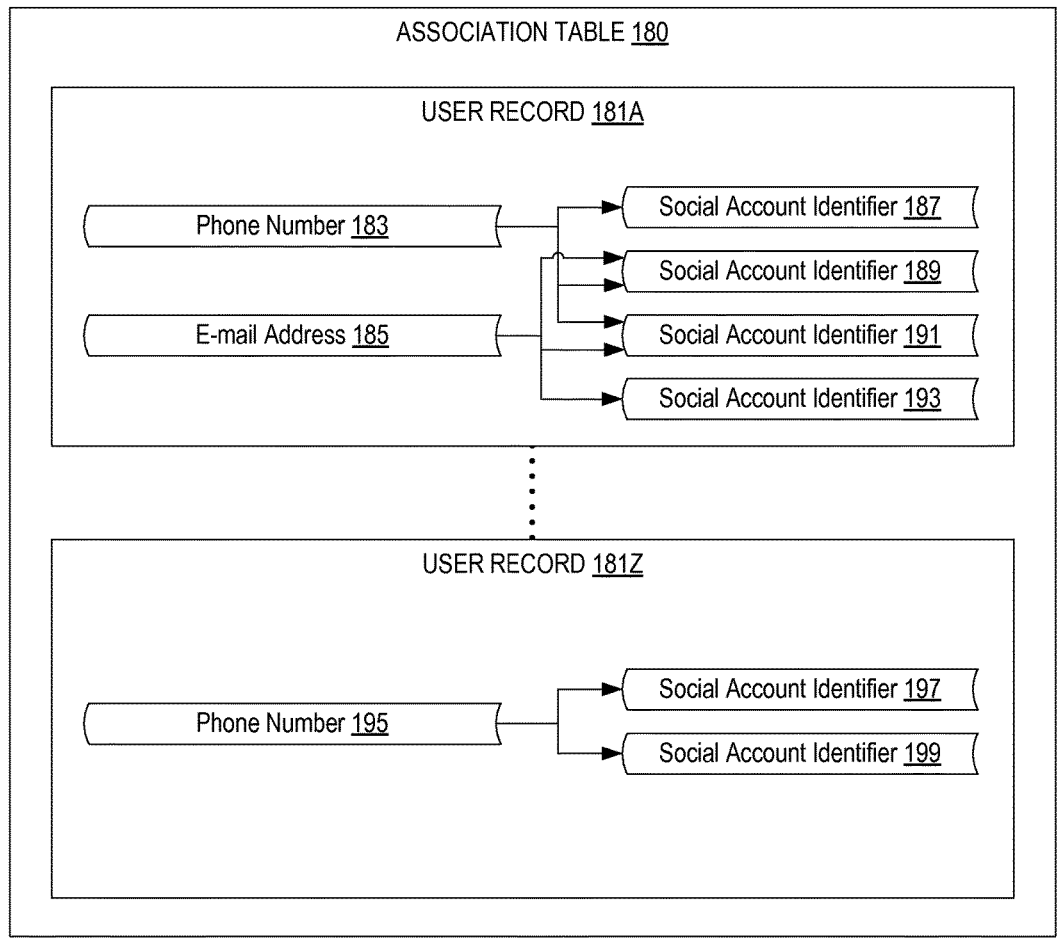
FIG. 1C is a diagram illustrating an association table in accordance with an implementation of the disclosure.

FIG. 1C is a diagram illustrating an association table according to some implementations of the disclosure. The association table 180 may be, for example, a contact list associated with a client device. The association table 180 includes user records 181A through 181Z, which may be the same as the user records 170A through 170Z, respectively, as described with respect to FIG. 1B. The user record 181A is illustrated as having two contact identifiers for a user: phone number 183 and e-mail address 185. Each contact identifier is mapped to a social media account using a social account identifier (e.g., an account number associated with the social media account). For example, phone number 183 is shown as being associated with social account identifiers 187, 189, and 191, and e-mail address 185 is shown as being associated with social account identifiers 189, 191, and 193. In some scenarios, two different contact identifiers may be associated with the same social media account (e.g., phone number 183 and e-mail address 185 are both associated with social account identifiers 189 and 191. The user record 181Z is illustrated as having one contact identifier for a user: phone number 195. The phone number 195 is associated with two account identifiers 197 and 199.

Figure 2:
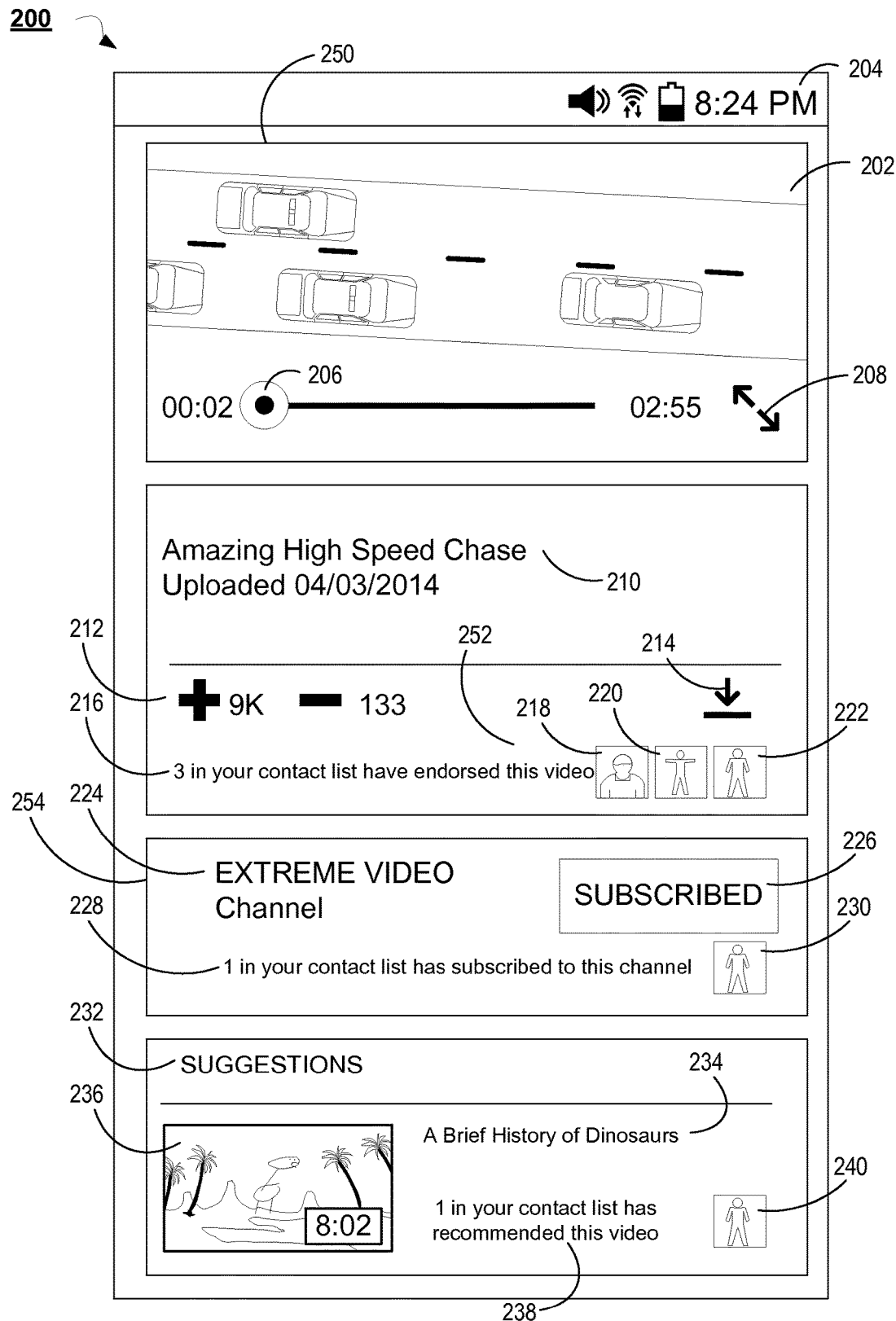
FIG. 2 depicts an illustrative graphical user interface that displays social annotations according to an implementation of the disclosure.

FIG. 2 depicts an illustrative graphical user interface (GUI) 200 that displays social annotations according to an implementation of the disclosure. For example, GUI 200 may be generated for display using a media viewer of a client device (e.g., the media viewer 112A of the client device 110A). GUI 200 includes a media player portion 250 presenting a media item, such as video 202, and an overhead display 204 that displays client device indicators. The media player portion 250 includes a playback indicator 206, which indicates the current playback time of the video 202 and may be displayed as an overlay on the video 202 or displayed adjacent to the video 202. A full-screen option 208 may also be included to switch the video 202 between a full-screen view mode and a reduced view mode. Information related to the video 202 is displayed adjacent to the video 202. The information includes a video title 210, approval indicators 212, which may indicate a collective approval/disapproval ratings from any viewers that have viewed the video 202, and a download indicator 214 that may be used to indicate whether the video is downloadable.

GUI 200 may also include portion 252 that identifies contacts who have endorsed video 202. In particular, portion 252 includes social annotations 218, 220, 222 are displayed adjacent to or near the video 202. Each of the three social annotations 218, 220, 222 may have been derived from a contact list of the user in accordance with the implementations described herein, and are presented as decorative elements (e.g., thumbnail images/representations of contacts) to indicate to the user of the client device that the individuals corresponding to each of the social annotations 218, 220, 222 have taken an action with respect to the video 202 that indicates that they endorse the video. The actions may have been taken using respective social accounts of the individuals. In some implementations, the respective social accounts may all correspond to the same social media service, or may correspond to different social media services. In some implementations, the user may select any of the social annotations 218, 220, 222. For example, one or more of the social annotations 218, 220, 222 may be a clickable element, and the selection of the social annotation 218 may cause a GUI to be presented that displays a social media page associated with the social annotation 218. The social media page may correspond to the social media account that was used to endorse the video 202. In some implementations, the social media page may be the GUI that contains the endorsement of the video 202 (e.g., a GUI within the social media account that contains a review of the content item). Each decorative element may correspond to an image of a contact of the user sourced from a respective social account of the contact, or in some embodiments sourced from the client device. A message 216 may also be displayed that informs the user that three of his/her contacts have endorsed the video 202.

GUI 200 may also include a channel portion 254 that may present, for example, a channel indicator 224, for which the video 202 is associated with. If the user is subscribed to the channel, a subscription indicator 226 may be displayed. If the user is not subscribed to the channel, the subscription indicator 226 may be replaced with a selectable option to subscribe to the channel. A social annotation 230 is also displayed next to the channel information, which indicates (along with the message 228) that one of the user's contacts has subscribed to the channel. For example, a contact of the user may have subscribed to the channel and also endorsed the video 202, and thus social annotations 222 and 230, although applied to different items, are indicative of the same contact.

The GUI 200 also includes a suggestions portion 232, which may suggest media items to the user based on similarity to the video 202 or based on a recommendation made by one of the contacts of the user. For example, a thumbnail image of a recommended video 236 may be displayed, along with a title 234 of the recommended video 236, a social annotation 240 and related message 238. In some implementations, the recommended media item may be presented based on a metric relating to a particular contact of the user. For example, the contact corresponding to the social annotation 240 may be a contact in which the user frequently communicates with (e.g., the user has spent more time on the phone with the contact than his/her other contacts). Accordingly, a recommended media item may be presented to the user based on an endorsement of that media item by the contact. In some implementations, a contact from which social annotations have been derived most frequently may be given more weight than other contacts when identifying a media item to recommend. For example, if the social annotations 222 and 230 correspond to the same contact, a socially-annotated media item endorsed by that contact may be presented as a recommendation to the user, as more social annotations in the GUI 200 were derived based on that contact than other contacts of the user.

Figure 3:
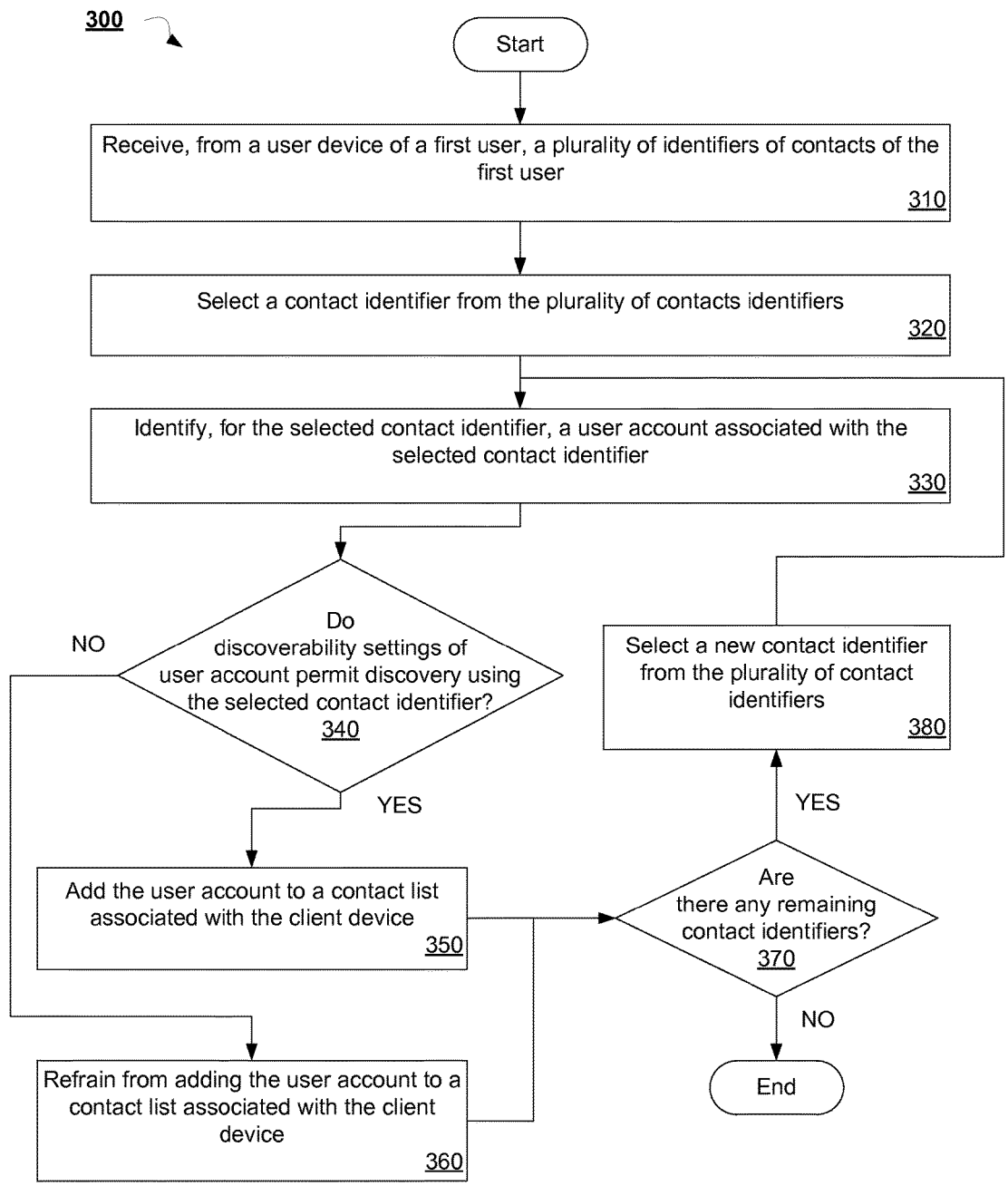
FIG. 3 is a flow diagram illustrating a method for associating user accounts of contacts of a user with the a contact list of the user in accordance with an implementation of the disclosure.

FIG. 3 is a flow diagram illustrating a method 300 for associating user accounts of contacts of a user with a contact list of the user according to an implementation of the disclosure. The method 300 may be performed by processing logic that includes hardware (e.g., circuitry, dedicated logic, programmable logic, microcode, etc.), software (e.g., instructions run on a processing device to perform hardware simulation), or a combination thereof. In one implementation, method 300 may be performed by association component 130 as described with respect to FIGS. 1A and 1B.

Referring to FIG. 3, method 300 begins at block 310 when a plurality of contact identifiers of contacts of a first user is received from a client device of the first user. For example, the plurality of contact identifiers may be received by an association service (e.g., the association component 130 of the association server 120) in the form of a contact list maintained on the client device (e.g., any one of the client devices 110A through 110Z). In some implementations, the plurality of contact identifiers may be received from a source other than the client device. For example, the association service may retrieve the plurality of contact identifiers from its own internal storage, from a data store (e.g., the data store 106), or from a third party service (e.g., the recommendation server 140, or any of the social media servers 160A through 160Z). In some implementations, the plurality of contact identifiers (e.g., contact list) may be received periodically, for example, at predetermined time intervals. In some implementations, the plurality of contact identifiers may be received in response to a change being made to the plurality of contact identifiers (e.g., new contacts are added to a contact list, contacts are deleted, or a phone number of a contact changes). The client device, for example, may automatically transmit the plurality of contact identifiers to the association server after the change occurs. In some implementations, the plurality of contact identifiers may be requested directly (e.g., the association server 120 may request a contact list from a client device 110A).

At block 320, a contact identifier is selected (e.g., using the association component 130) from the received plurality of contact identifiers for processing. At block 330, a user account is identified for the selected contact identifier. In some implementations, more than one user account may be identified for the selected contact identifier. One or more user accounts associated with the contact identifier may be identified using any suitable method described herein (e.g., identified using the discoverability module 132 of the association component 130).

At block 340, a determination is made as to whether a discoverability setting corresponding to the identified user account permits the user account from being located using the contact identifier. If it is determined that discoverability setting permits the user account to be located using the contact identifier, method 300 proceeds to block 350 where the user account is added to a contact list associated with the client device. For example, the user account may be added by generating or updating a record in the contact list (e.g., the association table 180) to include an identifier of the user account (e.g., an account number) such that the identifier of the user account is associated with the contact identifier of the record. In some implementations, the contact list may be stored externally or remotely from the client device (e.g., on the data store 106, the association server 120, the recommendation server 140, one of the social media servers 160A through 160Z, or on combinations thereof). In some implementations, the contact list is stored locally on the client device. For example, the identifier of the user account may be transmitted to the client device to be added to the contact list.

If it is determined that the discoverability setting corresponding to the contact identifier does not permit using the contact identifier to locate the user account, method 300 proceeds to block 360 where the association service refrains from adding the user account to the contact list associated with the client device. In some implementations, the contact identifier may be discarded altogether, or may be retained for use in locating other user accounts that have discoverability settings that permit using contact identifiers to locate corresponding accounts. In some implementations, a flag indicating that the contact identifier was not permitted by the discoverability setting of a user account of a particular social media service may be stored in the contact list.

At block 370, it is determined whether there are any remaining contact identifiers that have yet to be processed. If so, method 300 proceeds to block 380 where a new contact identifier is selected from the plurality of contact identifiers. Method 300 continues to cycle through blocks 330, 340, 350, 360, 370, and 380, and ends when all of the contact identifiers of the plurality of contact identifiers have been processed. In some implementations, all contact identifiers may be transmitted simultaneously to various social media services. In some implementations, method 300 may be performed each time one or more new contact identifiers are added to the contact list associated with the client device (e.g., a user of the client device adds a new contact phone number and/or e-mail address to the contact list, which may correspond to the same contact or different contacts). The client device may then transmit the newly added contact identifier or identifiers to the association service to perform the appropriate operations of method 300.

Figure 4:
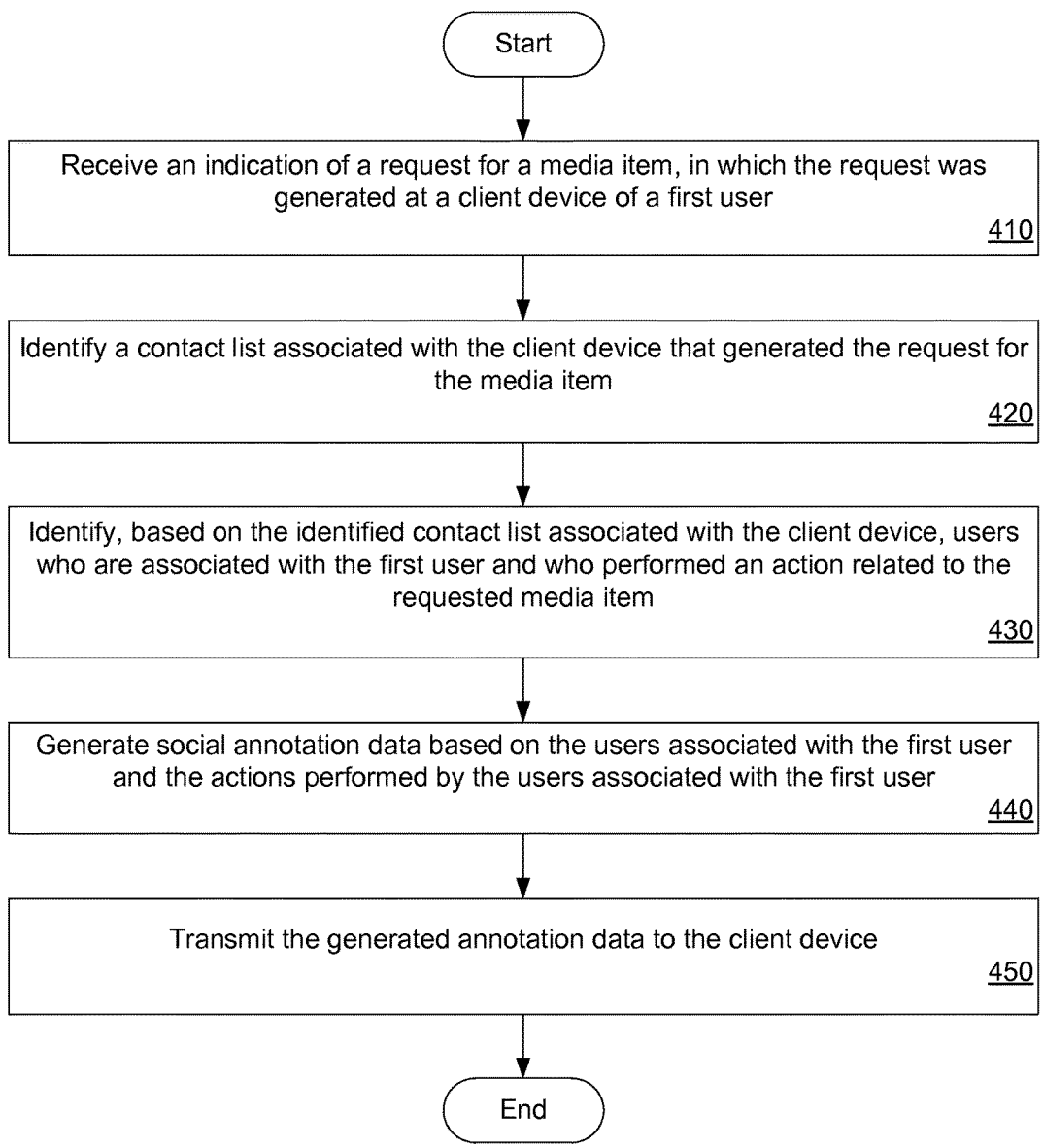
FIG. 4 is a flow diagram illustrating a method for generating social annotations of a media item in accordance with an implementation of the disclosure.

In one implementation, the operations of method 300 may be modified to search for social media accounts associated with a user of the client device. For example, this implementation could be utilized when the user purchases a new phone so that information on the user's social media accounts may be identified based on the user's phone number or e-mail address and automatically imported into the phone. A contact identifier of the client device (e.g., a phone number linked to the client device) may be transmitted to the association service (e.g., the association component 130), which may then perform the operations of method FIG. 4 is a flow diagram illustrating a method 400 for generating social annotations of a media item according to an implementation of the disclosure. The method 400 may be performed by processing logic that includes hardware (e.g., circuitry, dedicated logic, programmable logic, microcode, etc.), software (e.g., instructions run on a processing device to perform hardware simulation), or a combination thereof. In one implementation, method 400 may be performed the annotation component 150 as described with respect to in FIGS. 1A and 1B.

Referring to FIG. 4, method 400 begins at block 410 when an indication of a request for a media item is received (e.g., by the recommendation server 140), in which the request was generated by a client device of a first user. For example, the indication may be a request received by a recommendation server (e.g., the annotation component 150 of the recommendation server 140) from the client device (e.g., any of the client devices 110A through 110Z), or from a third party (e.g., from the association server 120 or any of the social media servers 160A through 160Z).

At block 420, a contact list associated with the client device that generated the request for the media item is identified. In some implementations, the contact list is identified by utilizing information included in the request for the media item, or the indication of the request for the media item, to search for the contact list from a collection of contact lists. For example, a collection of contact lists (e.g., in the form of the multiple association tables 180 stored in the data store 106) may contain a contact list that corresponds to the client device. The contact list may include metadata that is matched to information contained in the request for the media item in order to identify the contact list (e.g., a phone number for the client device may be used to look up a remotely stored contact list). In some implementations, the contact list is identified by being may be made available to whichever device performs an annotation service (e.g., the annotation component 150 of the recommendation server 140) by the client device or a third party (e.g., a social media service), or may be retrieved directly from a storage location (e.g., the data store 106). For example, the client list, or contact identifiers from the list, may be transmitted directly from the client device to an annotation service along with the request for the media item.

At block 430, users who are followed by the first user, and who have performed an action related to the requested media item, are identified based on the identified contact list associated with the client device. An action performed by a user may be any action related to the requested media item or a substantially similar/related media item (e.g., if the requested media item is a television series, and the action is performed relative to an episode of the television series), including selecting to view the media item, downloading the media item, recommending the media item to a friend, endorsing the media item (e.g., "liking" the media content), generating a review of the media content, or any other suitable action. The contact list includes user accounts of a subset of the plurality of contacts of the first user. In some implementations, the subset is limited according to discoverability settings corresponding to the user accounts. The subset may be identified, or may have been previously identified, using an association service (e.g., the association component 130) to verify that the discoverability settings of the various user accounts permit the user accounts from being added to the contact list, in accordance with any of the implementations described herein. In some implementations, the subset is inclusive of the entire contact list.

At block 440, social annotation data is generated based on the users followed by the first user and the actions performed by the users followed by the first user. For example, an annotation service (e.g., the annotation component 150), may generate a social annotations for users that are followed (e.g., followed via a social media account, commonly contacted by the user, monitored by the user, etc.) and have performed one or more actions related to the requested media item. The annotation service may use a canonical identifier of the requested media item (in which the canonical identifier may be identified or generated by the item recognition module 152 of the annotation component 150) to search through user account data corresponding to each of the followed users. Once identified, an annotation record may be generated that includes data related to each user who performed an action, for example, a user account identifier of the user who performed the action, a picture of the user, an indicator of the action (e.g., that the user "liked" the media item), contextual data associated with the media item (e.g., a review of the media item), and an indicator as to whether or not the annotation was derived from a contact identifier (e.g., whether a telephone number of the user was used to identify the user account).

At block 450, the generated annotation data is transmitted to the client device, which may then be utilized by the client device to generate for display annotations along with the media item. In some implementations, the media item is also transmitted concurrently with the generated annotation data.

Figure 5:
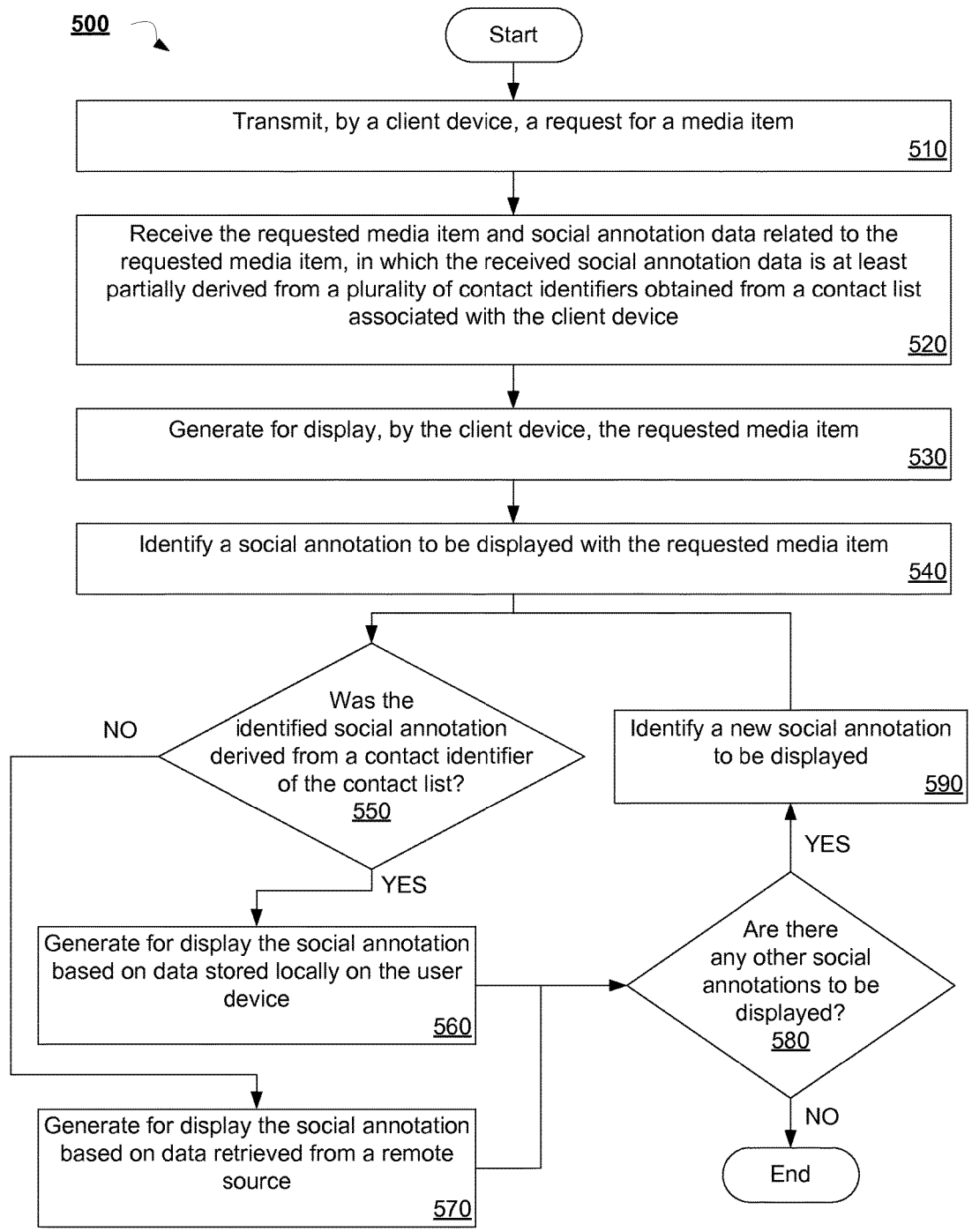
FIG. 5 is a flow diagram illustrating a method for presenting social annotations on a client device in accordance with an implementation of the disclosure.

FIG. 5 is a flow diagram illustrating a method 500 for presenting social annotations on a client device according to an implementation of the disclosure. The method 500 may be performed by processing logic that includes hardware (e.g., circuitry, dedicated logic, programmable logic, microcode, etc.), software (e.g., instructions run on a processing device to perform hardware simulation), or a combination thereof. In one implementation, method 500 may be performed by any of client devices 110A through 110Z as described with respect to FIG. 1A.

Referring to FIG. 5, method 500 begins at block 510 when a request for a media item is transmitted by a client device (e.g., by a processing device of the client device). For example, the request may be transmitted to a social media service (e.g., a service hosted on one of social media servers 160A through 160Z), a search engine via a web interface, an online merchant, or any suitable provider of media content. In some implementations, the request may be "indirectly" transmitted by the client device. For example, if the client device is accessing a social media service or another content provider, the client device may receive information to present to a user of the client device (e.g., using a media viewer of the client device). The received information may include a video, an advertisement, or any other type of media item, which was requested by the service providing the information (e.g., the service may identify a suitable advertisement for presenting to the user). Thus, in accordance with the implementations disclosed herein, it is to be understood that the act of transmitting a request for a media item by a client device includes any requests made by the client device directly, indirectly, or on behalf of the client device.

At block 520, the requested media item and social annotation data related to the requested media item are received (e.g., by a processing device of the client device). The received social annotation data is at least partially derived from a plurality of contact identifiers obtained from a contact list associated with the client device. In one implementation, the contact list (e.g., the association table 180) associated with the client device may be stored on the client device and may have been previously transmitted that can utilize the information in the contact list to generate social annotations (e.g., the annotation component 150 of the recommendation server 140). In one implementation, the contact list associated with the client device may be stored on a different device than the client device (e.g., the data store 106), and may be retrieved by the annotation component 150. The annotation component may then generate annotation data for the requested media item based on the plurality of contact identifiers in accordance with any of the implementations described herein.

At block 530, the requested media item is generated for display by the user device (e.g., by a media viewer of the client device). If the client device does not have a display screen, media item generated for display may be provided to a separate display device to display the media item. At block 540, a social annotation to be displayed with the requested media item is identified within the received annotation data. At block 550, it is determined whether the identified social annotation was derived from a contact identifier of the contact list. For example, the client device may determine that a user account corresponding to the social annotation (e.g., an account of an endorser/recommender of the media item) is in the contact list or is associated with a contact identifier (e.g., a telephone number) in the contact list. In some implementations, the received social annotation data may include an indicator (e.g., a flag) that the identified social annotation was derived from a contact identifier of the contact list. If the social annotation was determined to be derived from a contact identifier of the contact list, method 500 proceeds to block 560, and the identified social annotation is generated for display based on data stored locally on the user device that is associated with the corresponding contact identifier (e.g., the social annotation displayed may be a decorative element, such as a thumbnail representation of the contact that may be received from a social media server or may be stored locally on the client device with the contact's telephone number, a nickname associated with the contact that is stored on the client device, etc.). If the social annotation was determined to not be derived from a contact identifier of the contact list, method 500 proceeds to block 507, and the identified social annotation is generated for display based on data retrieved from a remote source (e.g., the displayed annotation is streamed from an appropriate social media service).

At block 580, it is determined whether there are any other social annotations to be displayed. If so, method 500 proceeds to block 590 where a new social annotation to be displayed is identified. Method 500 continues to cycle through blocks 550, 560, 570, 580, and 590, and ends when all of the social annotations in the received social annotation data have been processed. In some implementations, method 500 may limit the displayed social annotations to those that are compatible with a screen size of the client device. For example, compatibility module 156 may determine that, based on device account data corresponding to the client device, a finite number of social annotations will fit on the screen of the client device. In some implementations, the client device may randomly select which social annotations to display when screen size is limited.

In some implementations, an order in which the social annotations are displayed or a number of displayable social annotations are selected based on a priority value assigned to the social annotation. For example, a prioritization service (e.g., the prioritization module 154 of the annotation component 150) may include prioritization data with the social annotation data transmitted to the client device. The prioritization data may be based on various metrics related to how the user of the client device interacts with the contacts that the social annotations correspond to. For example, the prioritization service may use total phone call time, total number of calls, number of e-mail messages sent/received, or any other suitable metric and combinations thereof, to assign a prioritization weight to the social annotation. In some implementations, if multiple social annotations are generated for the media item, but not all can fit on the display screen of the client device at once, a subset of social annotations may be identified based on the prioritization data and displayed. The user may select an option on the client device to view the full list of social annotations. In some implementations, the prioritization may be based partially on an availability of a social account associated with the social annotation. In some implementations, an arrangement of the social annotations is based on priority values (e.g., the highest priority value social annotation is displayed closest to the media item).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Figure 6:
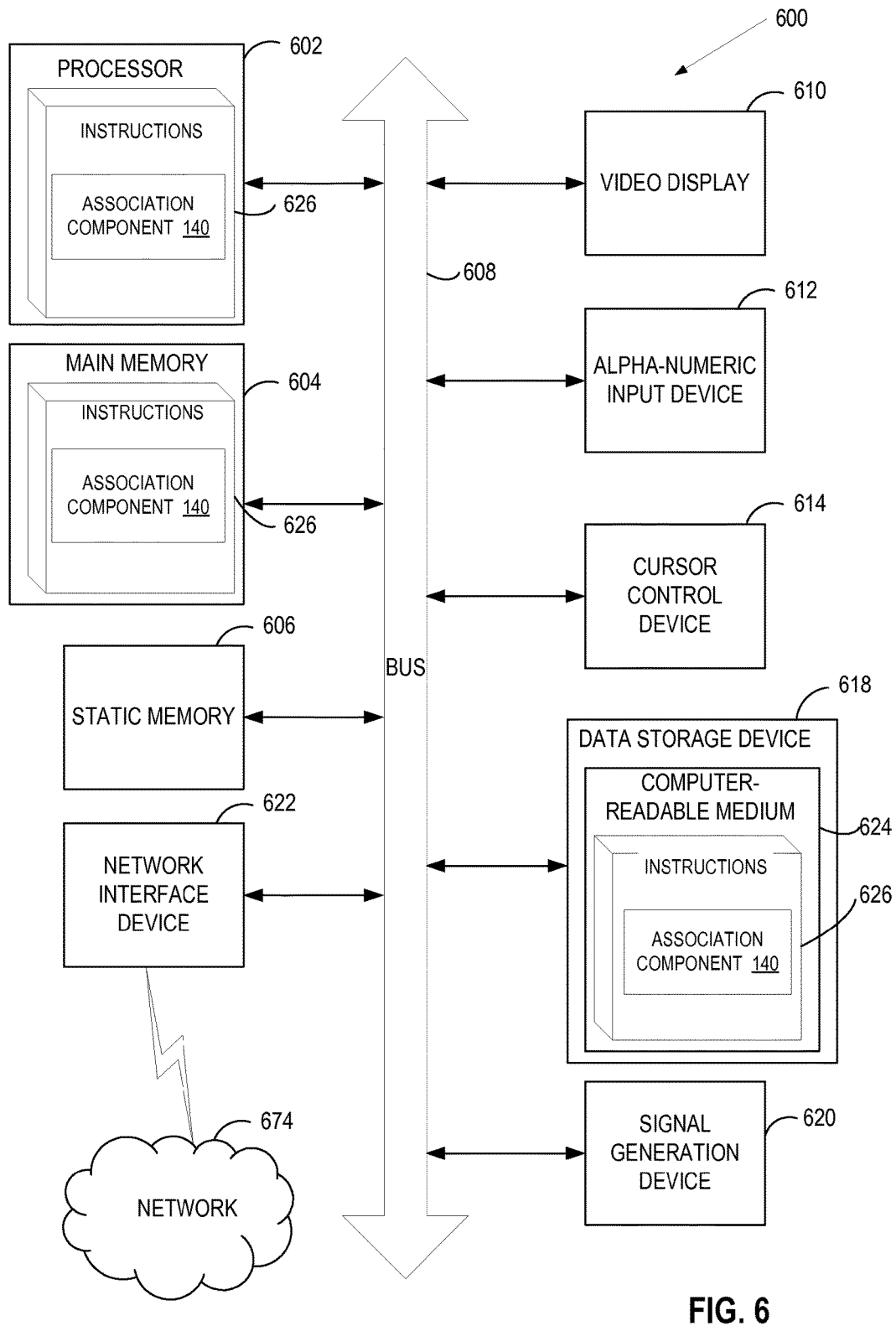
FIG. 6 is a block diagram illustrating an exemplary computer system in accordance with an implementation of the disclosure.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of any of client devices 110A through 110Z, data store 106, association server 120, recommendation server 140, and social media servers 160A through 160Z.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 (e.g., the network 105) via the network interface device 622.

In one implementation, the instructions 626 include instructions for one or more association components 130, which may correspond to the identically-named counterpart described with respect to FIGS. 1A and 1B, and/or a software library containing methods for associating contact identifiers with user accounts. Alternatively, or inclusively, instructions 626 may include instructions for one or more annotation components 150, which may correspond to the identically-named counterparts described with respect to FIGS. 1A and 1B, and/or a software library containing methods for generating social annotations for objects to be recommended. While the computer-readable storage medium 624 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "adding", "substracting", "removing", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    transmitting, by a client device, a request for a media item;
    receiving, by the client device, the media item and social annotation data related to the media item from a server;
    identifying, by the client device, at least one social annotation to be displayed with the media item based on the received social annotation data, wherein the at least one social annotation is derived from a contact identifier of a contact list stored on the client device, and wherein the contact list comprises user accounts of a subset of a plurality of contacts of a user of the client device;
    retrieving, by the client device, data stored locally on the client device for the at least one social annotation, the data stored locally on the client device comprising an image associated with the contact identifier;
    generating for display the at least one social annotation based on the data stored locally on the client device, wherein the social annotation comprises an indication of an action related to the media item, the action being taken by a contact from the contact list using a respective device of the contact prior to the client device transmitting the request for the media item, wherein the at least one social annotation comprises a first social annotation and a second social annotation, wherein the first social annotation and the second social annotation are assigned a first priority value and a second priority value, respectively, and wherein the first priority value is greater than the second priority value; and
    presenting, by the client device, the media item and the at least one social annotation based on the social annotation data, wherein the at least one social annotation comprises a representation of the contact from the contact list generated based on the data stored locally on the client device, wherein the first social annotation and the second social annotation are presented in an arrangement based on the first priority value and the second priority value, and wherein the first social annotation is presented closer to the media item than the second social annotation.

2. The method of claim 1, wherein the contact identifier comprises at least one of a telephone number, an e-mail address, a social account identifier, or a username.

3. The method of claim 1, wherein the social annotation data is generated based at least partially on the action taken by the contact of the contact list, the action further being taken using a social account associated with the contact, and wherein the action comprises at least one of selecting to view the media item, downloading the media item, recommending the media item, endorsing the media item, or generating a review of the media item.

4. The method of claim 1, wherein the first priority value and the second priority value are determined based on interactions between the user of the client device and one or more contacts of the contact list.

5. The method of claim 1, wherein each social annotation is a clickable element that is displayed adjacent to the media item.

6. The method of claim 5, wherein presenting at least one social annotation comprises retrieving the image associated with the contact identifier as the representation of the contact.

7. The method of claim 1, wherein the at least one social annotation represents a plurality of social annotations for the media item, wherein at least one of the plurality of social annotations is associated with the contact identifier of the contact list, and wherein the method further comprises:
    assigning, to each of the plurality of social annotations, a priority value based on interactions between the client device and contacts corresponding to each of a plurality of contact identifiers of the contact list;
    identifying a subset of the plurality of social annotations based on the respective priority values of each of the plurality of social annotations; and
    presenting the subset of social annotations with the media item.

8. The method of claim 7, wherein identifying the subset comprises determining a size of the subset based on a size of a displayable area of the client device.

9. A non-transitory machine-readable medium having instructions encoded thereon which, when executed by a processor, cause the processor to perform operations comprising:
    transmitting, by a client device, a request for a media item;
    receiving, by the client device, the media item and social annotation data related to the media item from a server;
    identifying at least one social annotation to be displayed with the media item based on the received social annotation data, wherein the at least one social annotation is derived from a contact identifier of a contact list stored on the client device, and wherein the contact list comprises user accounts of a subset of a plurality of contacts of a user of the client device;
    retrieving, by the client device, data stored locally on the client device for the at least one social annotation, the data stored locally on the client device comprising an image associated with the contact identifier;
    generating for display the at least one social annotation based on the data stored locally on the client device, wherein the social annotation comprises an indication of an action related to the media item, the action having been performed by a contact from the contact list using a respective device of the contact, wherein the at least one social annotation comprises a first social annotation and a second social annotation, wherein the first social annotation and the second social annotation are assigned a first priority value and a second priority value, respectively, wherein the first priority value is greater than the second priority value; and presenting, by the client device, the media item and the at least one social annotation based on the social annotation data, wherein the at least one social annotation comprises a representation of the contact from the contact list generated based on the data stored locally on the client device, wherein the first social annotation and the second social annotation are presented in an arrangement based on the first priority value and the second priority value, and wherein the first social annotation is presented closer to the media item than the second social annotation.

10. The non-transitory machine-readable medium of claim 9, wherein the contact identifier comprises at least one of a telephone number, an e-mail address, a social account identifier, or a username.

11. The non-transitory machine-readable medium of claim 9, wherein the social annotation data is generated based at least partially on the action taken by the contact of the contact list, the action further being taken using a social account associated with the contact, and wherein the action comprises at least one of selecting to view the media item, downloading the media item, recommending the media item, endorsing the media item, or generating a review of the media item.

12. The non-transitory, machine-readable medium of claim 9, wherein the first priority value and the second priority value are determined based on interactions between the user of the client device and one or more contacts of the contact list.

13. The non-transitory machine-readable medium of claim 9, wherein each social annotation is a clickable element that is displayed adjacent to the media item.

14. The non-transitory machine-readable medium of claim 13, wherein presenting at least one social annotation comprises retrieving a image of a contact as the representation of the contact.

15. The non-transitory machine-readable medium of claim 9, wherein the at least one social annotation represents a plurality of social annotations for the media item, wherein at least one of the plurality of social annotations is associated with the contact identifier of the contact list, and wherein the operations further comprise:

assigning, to each of the plurality of social annotations, a priority value based on interactions between the client device and contacts corresponding to each of a plurality of contact identifiers of the contact list;

identifying a subset of the plurality of social annotations based on the respective priority values of each of the plurality of social annotations; and presenting the subset of social annotations with the media item.

16. The non-transitory machine-readable medium of claim 15, wherein identifying the subset comprises determining a size of the subset based on a size of a displayable area of the client device.

17. A method comprising:

receiving, by a processing device, a request for a media item, wherein the request was generated at a client device of a first user, the client device storing a contact list comprising contact identifiers of a subset of a plurality of contacts of the first user;

identifying, by the processing device, at least one social account based on at least one of the contact identifiers by matching the at least one of the contact identifiers with a plurality of user accounts maintained by a social media server;

identifying, by the processing device, a second user who is associated with the social account and who performed, with a respective device, an action related to the media item prior to the processing device receiving the request for the media item, wherein the contact list comprises user account data for a subset of the plurality of contacts of the first user;

generating, by the processing device, social annotation data based on the contact identifiers and the action performed by the second user, wherein the social annotation data comprises data about a first social annotation and a second social annotation, wherein the first social annotation and the second social annotation are assigned, based on the user account data, a first priority value and a second priority value, respectively, wherein the social annotation data comprises instructions for presenting the first social annotation and the second social annotation in an arrangement based on the first priority value and the second priority value, wherein the first priority value is greater than the second priority value, and wherein the first social annotation is presented closer to the media item than the second social annotation; and transmitting the generated social annotation data to the client device.

18. The method of claim 17, further comprising:
receiving the contact list from the client device.

19. The method of claim 17, wherein each contact identifier comprises at least one of a telephone number, an e-mail address, or a username of a contact of the first user.

20. The method of claim 17, wherein each action comprises at least one of selecting to view the media item, downloading the media item, recommending the media item, endorsing the media item, or generating a review of the media item.

21. The method of claim 17, wherein generating the social annotation data comprises ranking the social annotation data based on interactions between the first user and each of the plurality of contacts using a respective contact identifier of the contact.

22. The method of claim 17, further comprising:
generating for display, on the client device, a decorative element indicative of a social annotation associated with the user account, wherein the decorative element is generated for display based on data stored on the client device, and wherein the data is associated with the contact identifier.

23. An apparatus comprising:
a memory; and
a processing device communicably coupled to the memory, the processing device to:
receive, by the processing device, a request for a media item, wherein the request was generated at a client device of a first user, the client device storing a contact list comprising contact identifiers of a subset of a plurality of contacts of the first user;

identify, by the processing device, at least one social account based on at least one of the contact identifiers by matching the at least one of the contact identifiers with a plurality of user accounts maintained by a social media server;

identify a second user who is associated with the social account and who performed, with a respective device, an action related to the media item, wherein the contact list comprises user account data for a subset of the plurality of contacts of the first user;

generate social annotation data based on the contact identifiers and the action performed by the second user, wherein the social annotation data comprises data about first social annotation and a second social annotation, wherein the first social annotation and the second social annotation are assigned, based on the user account data, a first priority value and a second priority value, respectively, wherein the social annotation data comprises instructions for presenting the first social annotation and the second social annotation in an arrangement based on the first priority value and the second priority value, wherein the first priority value is greater than the second priority value, and wherein the first social annotation is presented closer to the media item than the second social annotation; and transmit the generated annotation data to the client device.

24. The apparatus of claim 23, wherein the processing device is further to:
receive the contact list from the client device.

25. The apparatus of claim 23, wherein each contact identifier comprises at least one of a telephone number, an e-mail address, or a username of a contact of the first user.

26. The apparatus of claim 23, wherein each action comprises at least one of selecting to view the media item, downloading the media item, recommending the media item, endorsing the media item, or generating a review of the media item.

27. The apparatus of claim 23, wherein generating the social annotation data comprises ranking the social annotation data based on interactions between the first user and each of the plurality of contacts using a respective contact identifier of the contact.

28. The apparatus of claim 23, wherein the processing device is further to:
generate for display, on the client device, a decorative element indicative of a social annotation associated with the user account, wherein the decorative element is generated for display based on data stored on the client device, and wherein the data is associated with the contact identifier.

* * * * *